United States Patent [19]

Swarts

[11] Patent Number: 4,839,324

[45] Date of Patent: Jun. 13, 1989

[54] COMPOSITION FOR POLYMERIZATION WITH IMPROVED ACTIVATOR SYSTEM

[75] Inventor: Donald E. Swarts, Grand Island, N.Y.

[73] Assignee: E. I. Du Pont de Nemours and Company, Wilmington, Del.

[21] Appl. No.: 236,785

[22] Filed: Aug. 26, 1988

[51] Int. Cl.⁴ .................. B01J 31/04; B01J 31/06
[52] U.S. Cl. .................. 502/160; 502/170; 524/535; 525/246; 525/262; 525/274; 526/234
[58] Field of Search ............... 526/234; 525/246, 262, 525/274; 524/535; 502/160, 170

[56] References Cited

U.S. PATENT DOCUMENTS

| | | | |
|---|---|---|---|
| 3,154,600 | 10/1969 | Munn | 260/884 |
| 4,184,030 | 1/1980 | Dudinyak | 525/248 |
| 4,188,315 | 2/1980 | Dudinyak | 260/40 R |
| 4,189,451 | 2/1980 | Dudinyak | 525/262 |
| 4,197,215 | 4/1980 | Dudinyak | 252/428 |

*Primary Examiner*—C. Warren Ivy
*Assistant Examiner*—Alex H. Walker

[57] ABSTRACT

Composition for polymerization of ethylenically unsaturated monomer with initiator of perester salt of maleic acid and bisulfite activator in water-in-oil emulsion form.

4 Claims, 3 Drawing Sheets

COMPOSITION FOR POLYMERIZATION WITH IMPROVED ACTIVATOR SYSTEM

BACKGROUND

This invention relates to polymerization of ethylenically unsaturated monomers, preferably methyl methacrylate. More particularly, it relates to an initiator-activator system and process for such polymerization.

Aqueous activator systems with bisulfites in solution along with initiators of metal salts of hemi-peresters of maleic acid are disclosed in U.S. Pats. Nos. 4,184,030; 4,188,315; 4,189,451 and 4,197,215 (1980) all to Dudyniak. U.S. Pat. No. 3,154,600—Munn (1964) discloses a syrup and curing system. These patents are incorporated herein by reference.

The solution activator systems of those patents work well, but for high speed industrial processes, such as for sheet casting and injection molding of forms, it would be better to have a faster acting polymerization and cure system that can be mixed efficiently with syrup at high speed.

SUMMARY OF THE INVENTION

An initiator system for $\alpha,\beta$-ethylenically unsaturated monomers consisting essentially of A. a metal salt of hemi-perester of maleic acid having the formula:

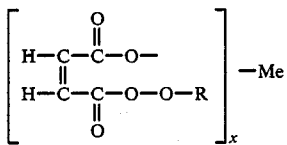

wherein
Me is a metal selected from the group consisting of Group IA metals, Group IIA metals, zinc, lead, cobalt, nickel, manganese and copper;
x is an integer having a value from 1 to the valence of the metal; and
R is a saturated tertiary alkyl radical;

B. an activator which is a salt of an oxo acid of sulfur selected from the group consisting of bisulfite, metabisulfite and thiosulfate salts or the free acid, said activator salt having a cation selected from the group consisting of Group IA metals, Group IIA metals, and ammonium, and said activator being present in a weight ratio to said metal salt of hemi-perester of maleic acid of from approximately 1:7 to 4:1; and C. a polar liquid,
wherein said activator is provided in the form of a water-in-oil emulsion.

DETAILED DESCRIPTION

To attain commercial production rates in processes of the invention, the activator must be rapidly mixed, over a short period of time, such as one second, into the polymerizable mixture. Aqueous bisulfite solution used as an activator for the peroxide initiator in this mixture, under such rapid mixing conditions, gives less than optimum cure and product property results, including longer cure times, and higher mix viscosity, with resulting losses in uniformity and physical properties.

To get faster cures and better process and product properties, under the required mixing conditions, the aqueous bisulfite must be pre-dispersed. Several methods of dispersion give only marginal or no improvement. These include (1) solvents (alcohols, strong acids, high dielectric constant liquids) and (2) milling the solid bisulfite in a suitable liquid medium. The method of disperison which works well is an emulsion. The aqueous bisulfite solution is dispersed in an organic liquid to make a water-in-oil type emulsion. This emulsion is stable for at least 6 months and active. It has a fine particle size of aqueous bisulfite, usually about 1 micron or less. It is added and mixed with the polymerizable mixture just prior to casting as noted above.

Figure 1:
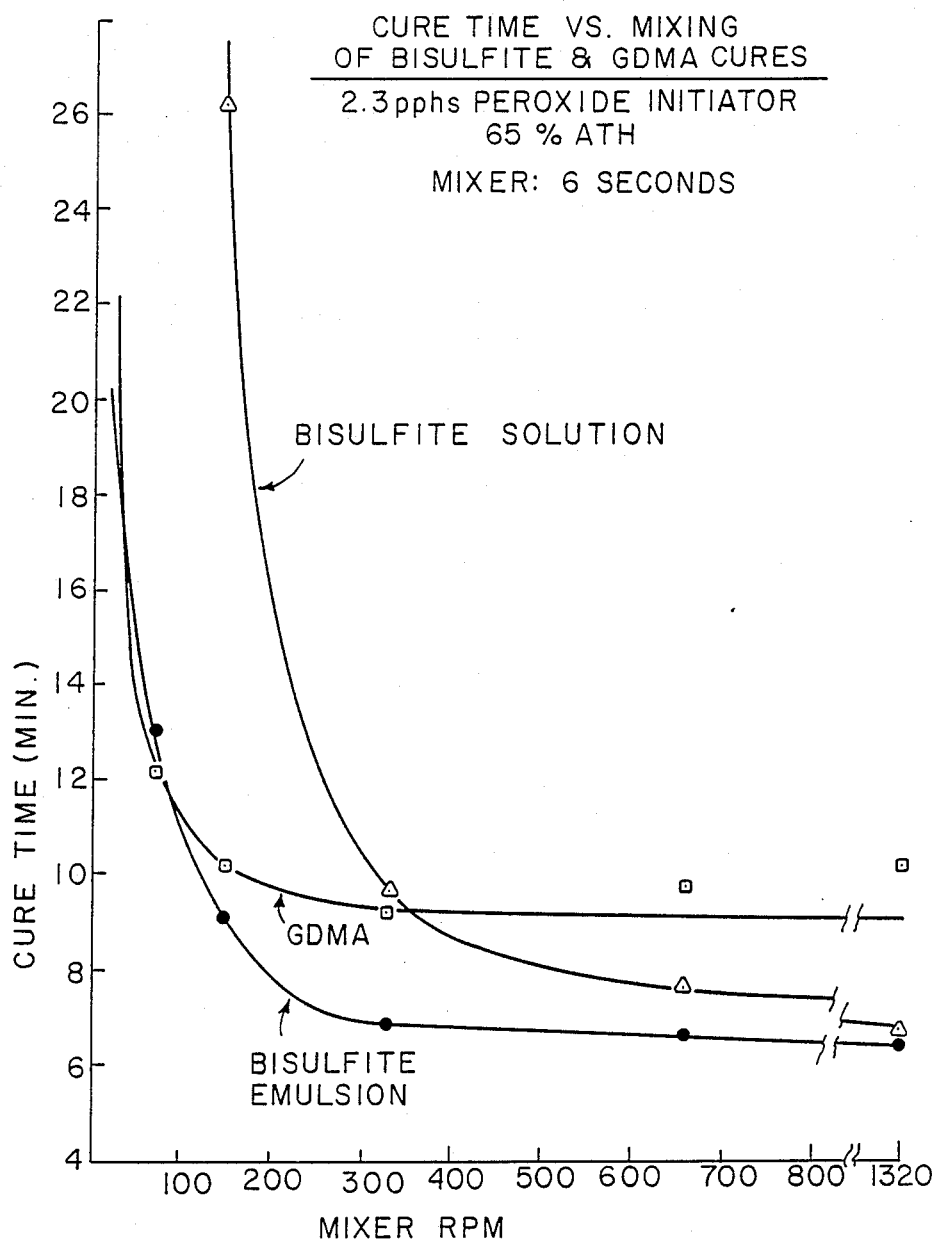
FIG. 1 is a graph showing advantages of the invention in permitting lower mixer speed.
Figure 2:
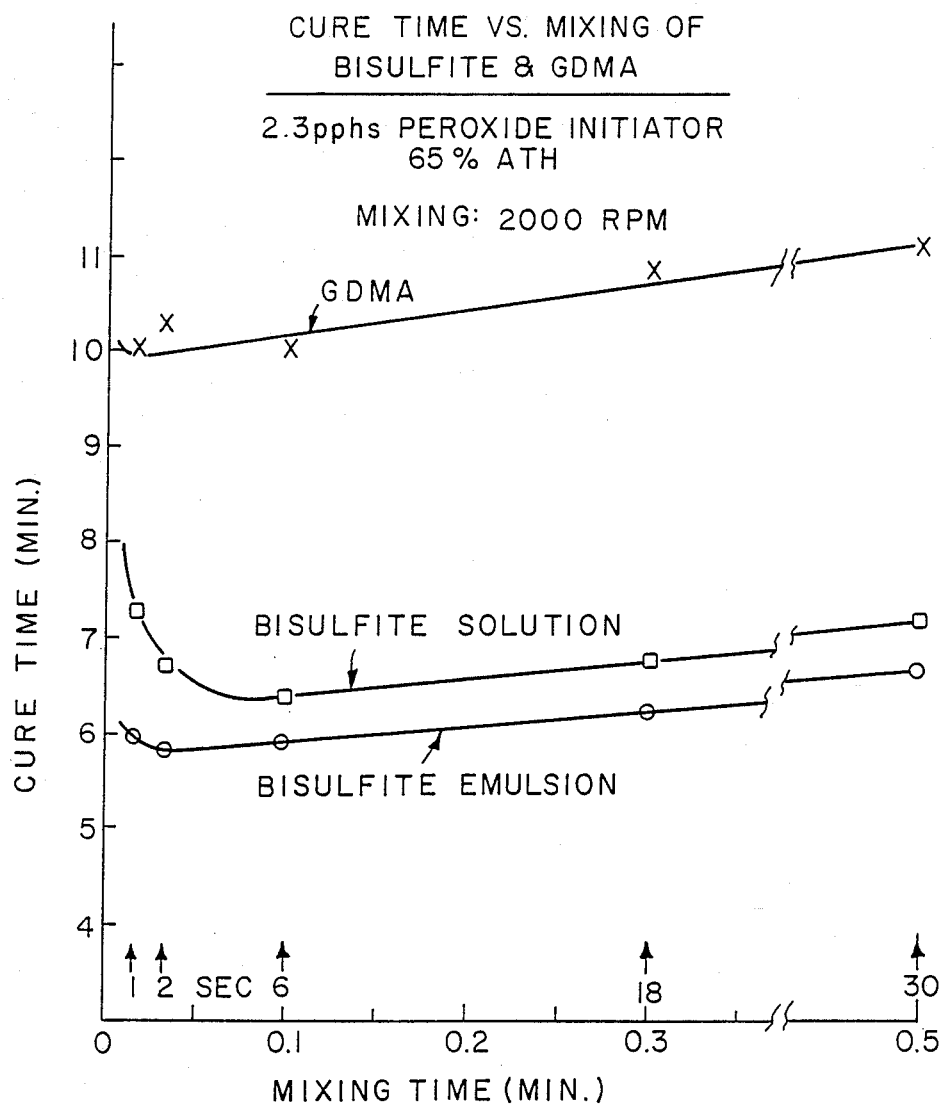
FIG. 2 is a similar graph on mixing time.
Figure 3:
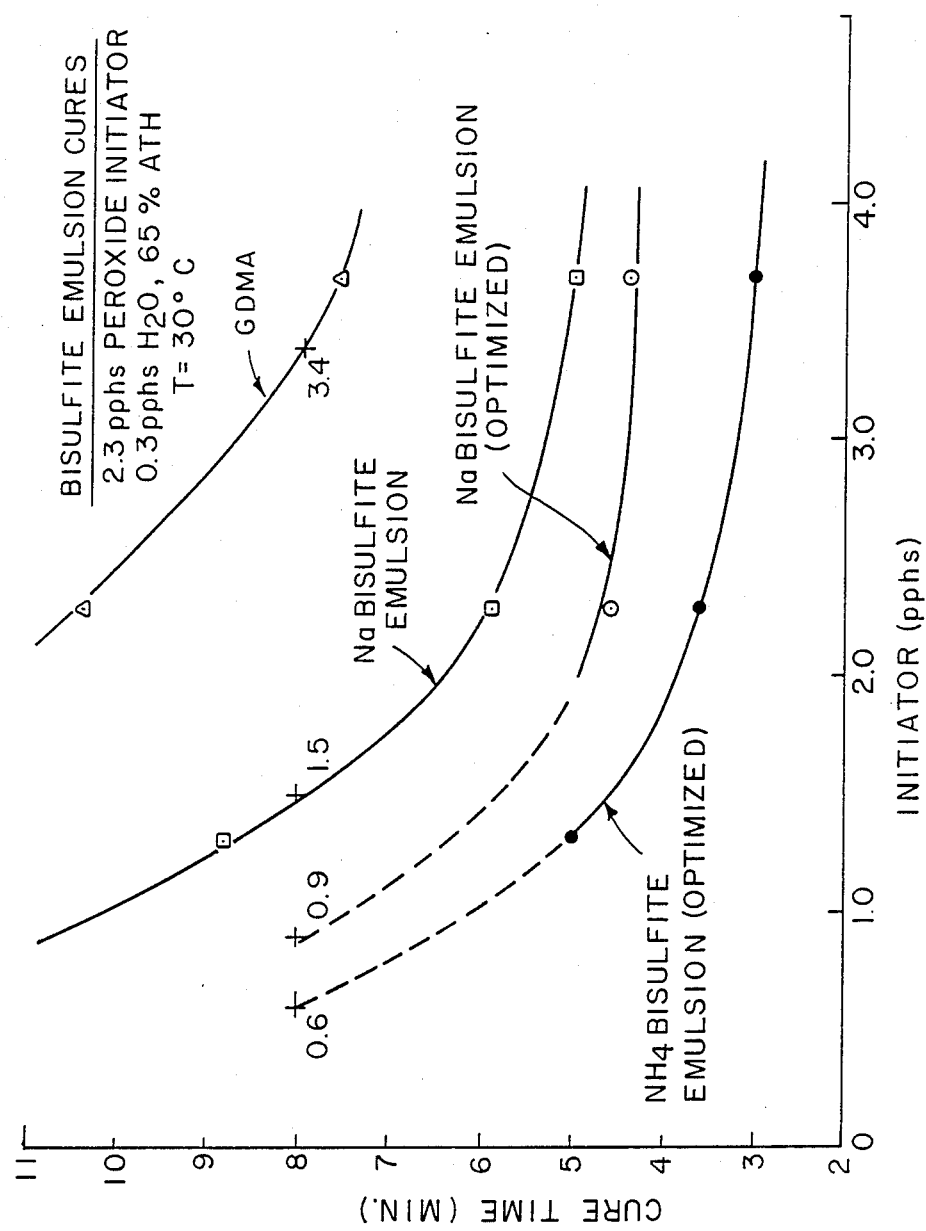
FIG. 3 is a similar graph on initiator content.

The improvement of the emulsified bisulfite activator over the aqueous bisulfite activator is shown in FIGS. 1, 2 and 3. FIG. 1 shows the efficiency of the bisulfite emulsion over the aqueous bisulfite solution in that much faster cures are attained at lower mixer rpm's during the 6 second mixing time. Results are as good as an all-organic activator ethylene glycol dimercapto acetate (GDMA) at the low mixer rpm. FIG. 2 shows the faster cure times at the short mixing times of 2 seconds or less for the emulsion compared to the solution at 2000 rpm, typical plant mixer speed.

Although any of the aqueous solutions of bisulfites can be used, the ammonium bisulfite is preferred due to its greater solubility in both water and the polymerizable mixture. FIG. 3 shows the comparison of an optimized ammonium bisulfite emulsion and an optimized sodium bisulfite emulsion. For a given level of t-butyl peroxide maleic acid hemi-perester initiator, the ammonium analog is 25–35% faster in cure rate. For a given cure rate, the ammonium analog requires less peroxide to achieve this rate, e.g. at 8.0 min. cure time the initiator required is 0.6 and 0.9 parts per hundred parts of resin (pphs), respectively, for the ammonium and sodium bisulfite emulsions.

EXAMPLE

Preparation of Bisulfite Emulsion

An emulsion of an oil-in-water is relatively easy to accomplish. Many are known in nature (e.g. milk) and synthesized (e.g. mayonnaise, latex paint). However, a water-in-oil emulsion is difficult to accomplish, the non-continuous water phase being very prone to recombine and separate out. Most of the techniques and equipment used to make oil-in-water emulsion will not work for water-in-oil emulsions. Special care and techniques have been developed in preparing the sensitive bisulfite emulsion. These include the proper type of mixer, using the optimum mixing speed and time, and controlling the level of bisulfite in the emulsion, the type of organc liquid medium, the surfactant type and level, and the temperature. The emulsion preparation has been developed to give optimum emulsion stability and viscosity, and the emulsion gives the optimum cure rate, mold release and product properties.

In the preparation of the emulsion a beeswax derivative surfactant (Atlas G-1702, ICI Americas), is added to the epoxidized soybean oil organic liquid medium (Paraplex G-62, C. P. Hall Co.) which has been heated to 70° C. The surfactant is stirred approximately one hour until it is dissolved. After the solution has cooled to room temperature, the solution is stirred with a high speed, high shear, circulation type mixer (Greerco homogenizer), then the aqueous bisulfite is slowly added to the vortex of the stirred solution. The solution is stirred for an additional 15 minutes. The emulsion temperature is not allowed to exceed 35° C. The resultant emulsion is milky white and has a particle size of 1 micron or less. It is stable and active for over 6 months.

| Ingredients | gms |
| --- | --- |
| epoxidized soybean oil | 125.5 |
| surfactant | 3.9 |
| 60% Ammonium bisulfite (aq.) | 69.7 |

The bisulfite may be any of several cations, including K+, Na+ or NH4+. The ammonium bisulfite (NH4HSO3) is preferred because of its greater solubility in water and in our polymerizable mixture.

This emulsion is used as an activator to provide the improved dispersion in the polymerizable mixture and the faster cure rates as shown in FIGS. 1, 2 and 3. The levels of ammonium bisulfite activator emulsion found most suitable for several peroxide levels are:

| initiator hemi-perester (pphs) | activator emulsion (pphs) | Peak Exotherm Time (min.) |
| --- | --- | --- |
| 1.23 | 0.68 | 5.5 |
| 0.98 | 0.40 | 7.3 |
| 0.63 | 0.30 | 11.0 |

I claim:

1. An initiator system for $\alpha,\beta$-ethylenically unsaturated monomers consisting essentially of
A. a metal salt of hemi-perester of maleic acid having the formula:

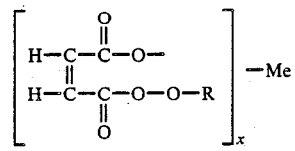

wherein
Me is a metal selected from the group consisting of Group IA metals, Group IIA metals, zinc, lead, cobalt, nickel, manganese and copper;
x is an integer having a value from 1 to the valence of the metal; and
R is a saturated tertiary alkyl radical;
B. an activator which is a salt of an oxo acid of sulfur selected from the group consisting of bisulfite, metabisulfite and thiosulfate salts or the free acid, said activator salt having a cation selected from the group consisting of Group IA metals, Group IIA metals, and ammonium, and said activator being present in a weight ratio to said metal salt of hemi-perester of maleic acid of from approximately 1:7 to 4:1; and
C. a polar liquid,
wherein said activator is provided in the form of a water-in-oil emulsion.

2. The initiator system of claim 1 wherein said activator cation is sodium, potassium, calcium, or ammonium.

3. The initiator system of claim 1 wherein said polar liquid is water.

4. The initiator system of claim 2 wherein said cation is ammonium.

* * * * *